United States Patent
Carroll

(10) Patent No.: US 11,981,300 B2
(45) Date of Patent: May 14, 2024

(54) MOTORIZED LIFTING SYSTEM FOR SEMI-TRAILER

(71) Applicant: Carroll Innovations, LLC, Claremore, OK (US)

(72) Inventor: Todd Carroll, Claremore, OK (US)

(73) Assignee: UA Holdings, Inc., Claremore, OK (US)

( * ) Notice: Subject to any disclaimer, the term of this patent is extended or adjusted under 35 U.S.C. 154(b) by 254 days.

(21) Appl. No.: 17/177,952

(22) Filed: Feb. 17, 2021

(65) Prior Publication Data

US 2021/0253070 A1 Aug. 19, 2021

Related U.S. Application Data

(60) Provisional application No. 62/977,809, filed on Feb. 18, 2020.

(51) Int. Cl.
| | |
|---|---|
| *B60S 9/06* | (2006.01) |
| *B60D 1/66* | (2006.01) |
| *B60S 9/04* | (2006.01) |
| *B60S 9/08* | (2006.01) |
| *B66F 3/44* | (2006.01) |

(52) U.S. Cl.
CPC .... *B60S 9/06* (2013.01); *B60D 1/66* (2013.01); *B60S 9/04* (2013.01); *B60S 9/08* (2013.01); *B66F 3/44* (2013.01)

(58) Field of Classification Search
CPC ..... B60S 9/08; B60S 9/04; B60S 9/06; B60D 1/66
USPC ............... 280/766.1; 254/419, 425
See application file for complete search history.

(56) References Cited

U.S. PATENT DOCUMENTS

| | | | | |
|---|---|---|---|---|
| 3,912,927 A * | 10/1975 | Hoffman, II | ............ | H04N 3/09 348/E3.01 |
| 6,598,886 B2 * | 7/2003 | Baird | ........................ | B60P 3/34 254/419 |
| 7,163,207 B2 * | 1/2007 | Baird | ........................ | B60P 3/34 254/419 |
| 7,325,786 B2 * | 2/2008 | Drake, III | ................. | B60S 9/08 254/419 |
| 7,328,884 B2 * | 2/2008 | Garceau | .................... | B66F 3/44 254/126 |
| 8,590,417 B1 * | 11/2013 | Bono | ........................ | B60S 9/08 254/419 |
| 2003/0209896 A1 * | 11/2003 | Daniel | ..................... | B60S 9/08 280/766.1 |

(Continued)

OTHER PUBLICATIONS

Machine Design (found at: https://www.machinedesign.com/learning-resources/whats-the-difference-between/article/21832142/whats-the-difference-between-spur-helical-bevel-and-worm-gears) (Year: 2015).*

(Continued)

*Primary Examiner* — Mahdi H Nejad
(74) *Attorney, Agent, or Firm* — Head, Johnson, Kachigian & Wilkinson, PC

(57) ABSTRACT

A motorized lifting system for use on a semi-trailer. The lifting system may comprise a lifting unit capable of mounting to a jack on the semi-trailer, allowing the lifting unit to raise and lower the dolly legs of the jack. The lifting unit may comprise a motor and a series of sprockets and chains connecting the motor to a drive shaft that mounts to a rod of the jack, such that turning the rod raises or lowers the dolly legs.

2 Claims, 19 Drawing Sheets

(56) References Cited

U.S. PATENT DOCUMENTS

| | | | |
|---|---|---|---|
| 2006/0237602 A1* | 10/2006 | Whitley | B65G 23/22 |
| | | | 248/205.1 |
| 2007/0114502 A1* | 5/2007 | Garceau | B66F 3/12 |
| | | | 254/126 |
| 2007/0210289 A1* | 9/2007 | Drake | B66F 3/16 |
| | | | 74/89.23 |
| 2008/0146397 A1* | 6/2008 | Drake | B60S 9/08 |
| | | | 475/206 |
| 2009/0008917 A1* | 1/2009 | Daniel | B60S 9/06 |
| | | | 254/419 |
| 2015/0224838 A1* | 8/2015 | Laarman | B60S 9/08 |
| | | | 280/766.1 |
| 2017/0015286 A1* | 1/2017 | Klassy | B60S 9/08 |
| 2019/0009757 A1* | 1/2019 | Hicks | F16H 3/66 |
| 2023/0159005 A1* | 5/2023 | Ranglin | B60S 9/08 |
| | | | 254/419 |
| 2023/0391297 A1* | 12/2023 | Carroll | B60S 9/06 |

OTHER PUBLICATIONS

McCabe, Robert E. Lanckton, Philip G. Dwyer, William V.. (1984). Metering Pump Handbook—8.3 External Speed Reduction. Industrial Press. Retrieved from https://app.knovel.com/hotlink/pdf/id:kt00U73IN2/metering-pump-handbook/external-speed-reduction (Year: 1984).*

* cited by examiner

MOTORIZED LIFTING SYSTEM FOR SEMI-TRAILER

CROSS REFERENCE

This application is based on and claims priority to U.S. Provisional Application No. 62/977,809 filed Feb. 18, 2020.

BACKGROUND OF THE INVENTION

Field of the Invention

This invention relates generally to a lifting system, and more particularly, but not by way of limitation, to a motorized lifting system for use with a semi-trailer.

Description of the Related Art

Jacks for semi-trailers typically require manual cranking. Given the fact that semi-trailers typically weigh tens of thousands of pounds, it is no surprise that manually cranking a semi-trailer jack is difficult work and can easily lead to injury.

Motorized jacks exist for other applications, but typically are not capable of lifting the weight of a semi-trailer.

Based on the foregoing, it is desirable to provide a semi-trailer lifting system that is motorized, yet capable of lifting a semi-trailer.

SUMMARY OF THE INVENTION

In general, in a first aspect, the invention relates to a lifting system comprising a lifting unit capable of mounting to a jack. The lifting unit may comprise: a motor; a worm drive gear assembly powered by the motor; and a coupling capable of connecting the worm drive gear assembly to a shaft of the jack. The coupling may comprise: a first half of the coupling extending from the worm drive gear assembly, where the first half of the coupling has a plurality of lateral projections extending therefrom; a second half of the coupling, where the second half of the coupling has a plurality of lateral projections extending therefrom and where the lateral projections of the second half of the coupling are capable of interlocking with the lateral projections of the first half of the coupling such that turning the first half of the coupling causes the second half of the coupling to turn; and a clamp capable of clamping the second half of the coupling to the shaft, where the clamp comprises a first portion extending from the second half of the coupling, where the first portion is located on a first side of the shaft during use, and a second portion capable of being placed on a second side of the shaft during use such that the first portion and the second portion are capable of being joined together to clamp the shaft in place relative to the second half of the coupling.

The lifting system may further comprise a housing, where the housing has a first compartment housing switch components and a second compartment housing the worm drive gear assembly. The lifting system may further comprise a plurality of bearings sealing the housing. The lifting system may further comprise a bracket capable of clamping to a dolly leg of the jack and to the lifting unit.

In a second aspect, the invention relates to a lifting system comprising a lifting unit capable of mounting to a jack. The lifting unit may comprise: a motor; a power drive shaft connected to the motor, with a power drive sprocket mounted thereon; an idler shaft with a first idler sprocket and a second idler sprocket mounted thereon; a drive shaft with a first drive sprocket, a second drive sprocket, and a third drive sprocket mounted thereon, where the drive shaft is capable of receiving a rod of the jack such that turning the drive shaft raises or lowers one or more dolly legs of the jack; a first chain connecting the first idler sprocket to the first drive sprocket; a second chain connecting the power drive sprocket to the second drive sprocket; and a third chain connecting the second idler sprocket to the third drive sprocket. The lifting unit may further comprise a front cover and a back cover capable of connecting to the back cover.

The lifting unit may further comprise two sealed roller bearings, one on each end of the drive shaft. The lifting unit may further comprise a pressed in bronze oil impregnated bearing between the first idler sprocket and the second idler sprocket and a pressed in bronze oil impregnated bearing between the first drive sprocket and the second drive sprocket. The third drive sprocket may be permanently attached to the drive shaft.

The first idler sprocket may have 11 teeth; the second idler sprocket may have 11 teeth; the first drive sprocket may have 19 teeth; the second drive sprocket may have 70 teeth; the third drive sprocket may have 70 teeth; and the power drive sprocket may have 12 teeth.

The lifting system may further comprise one or more of the following: wiring cables; a limit switch; a hi-lo knob; a solenoid box; a connecting clamp; and a bolt with a lock nut. The connecting clamp may comprise a first end capable of clamping to one of the dolly legs of the jack and a second end capable of clamping to the motor. The first end may be U-shaped and the second end may be round.

In a third aspect, the invention relates to a method of using a lifting system to operate a jack, the method comprising: removing a handle from a rod of the jack; mounting a motorized lifting unit onto the jack; and operating the lifting unit, which causes one or more dolly legs of the jack to raise or lower. The motorized lifting unit may comprise: a motor; a worm drive gear assembly powered by the motor; a bracket capable of clamping to a dolly leg of the jack and to the lifting unit; and a coupling capable of connecting the worm drive gear assembly to a shaft of the jack. Mounting the motorized lifting unit onto the jack may comprise: sliding the motorized lifting unit over the shaft; clamping the motorized lifting unit to one of the dolly legs and to the motor via a bracket; and connecting the worm drive gear assembly to the shaft via the coupling and four bolts.

Figure 1:
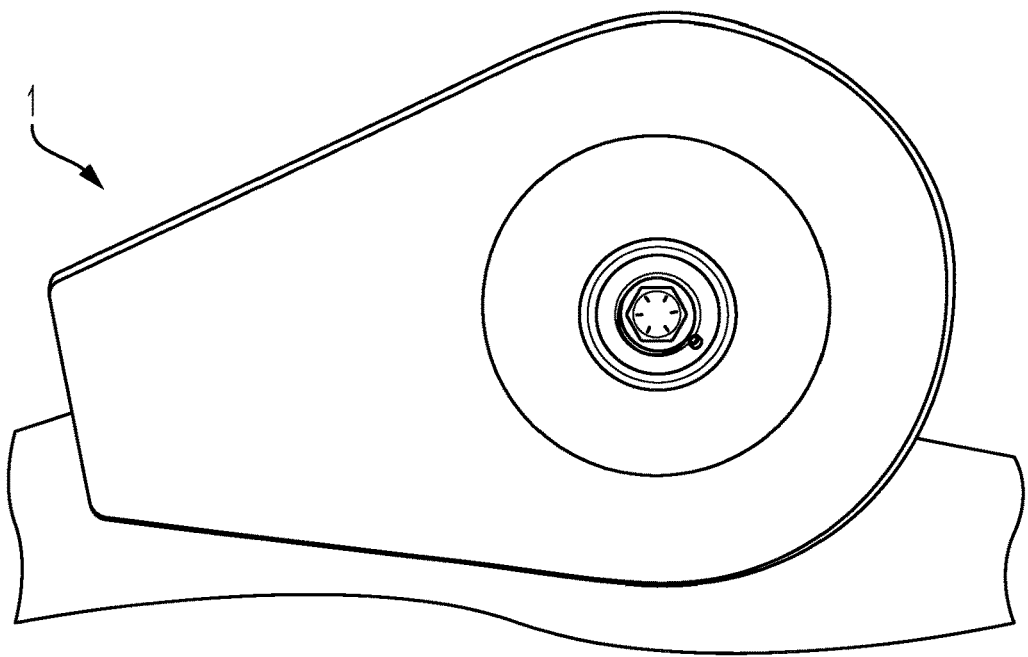
FIG. 1 is a front view of the first embodiment of the lifting unit of the present invention.
Figure 2:
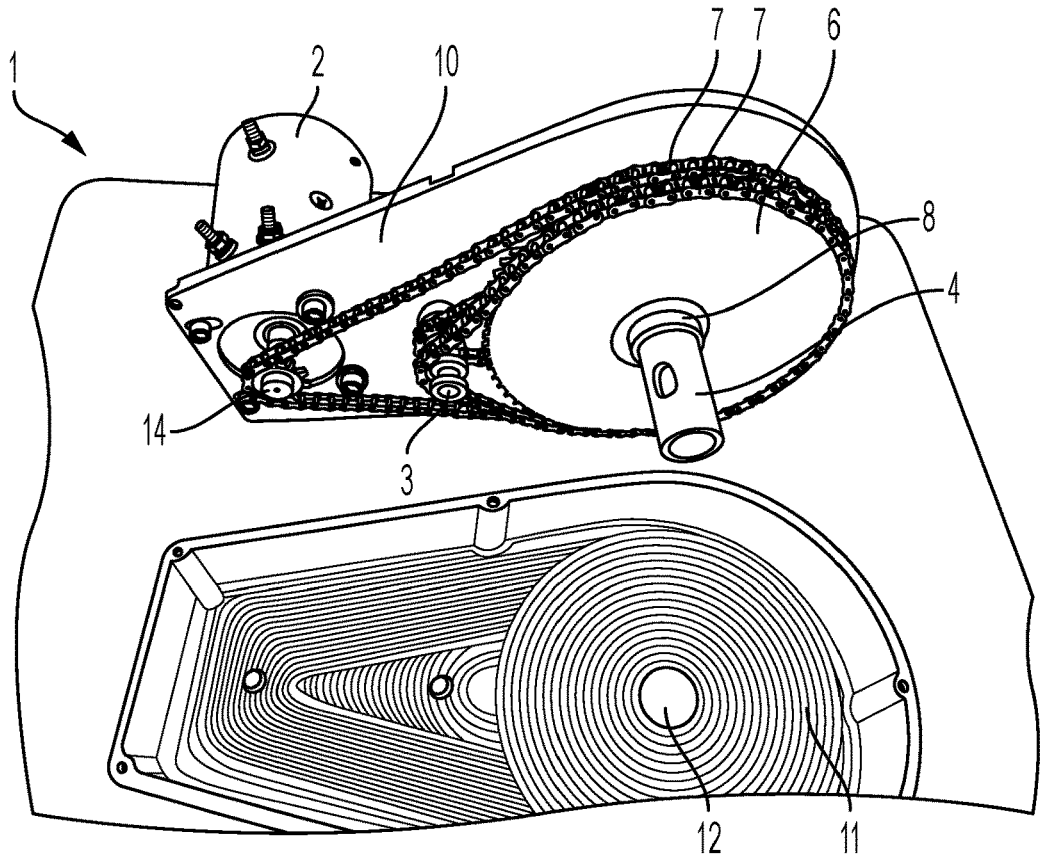
FIG. 2 is a perspective view of the first embodiment of the lifting unit with its front cover removed.
Figure 3:
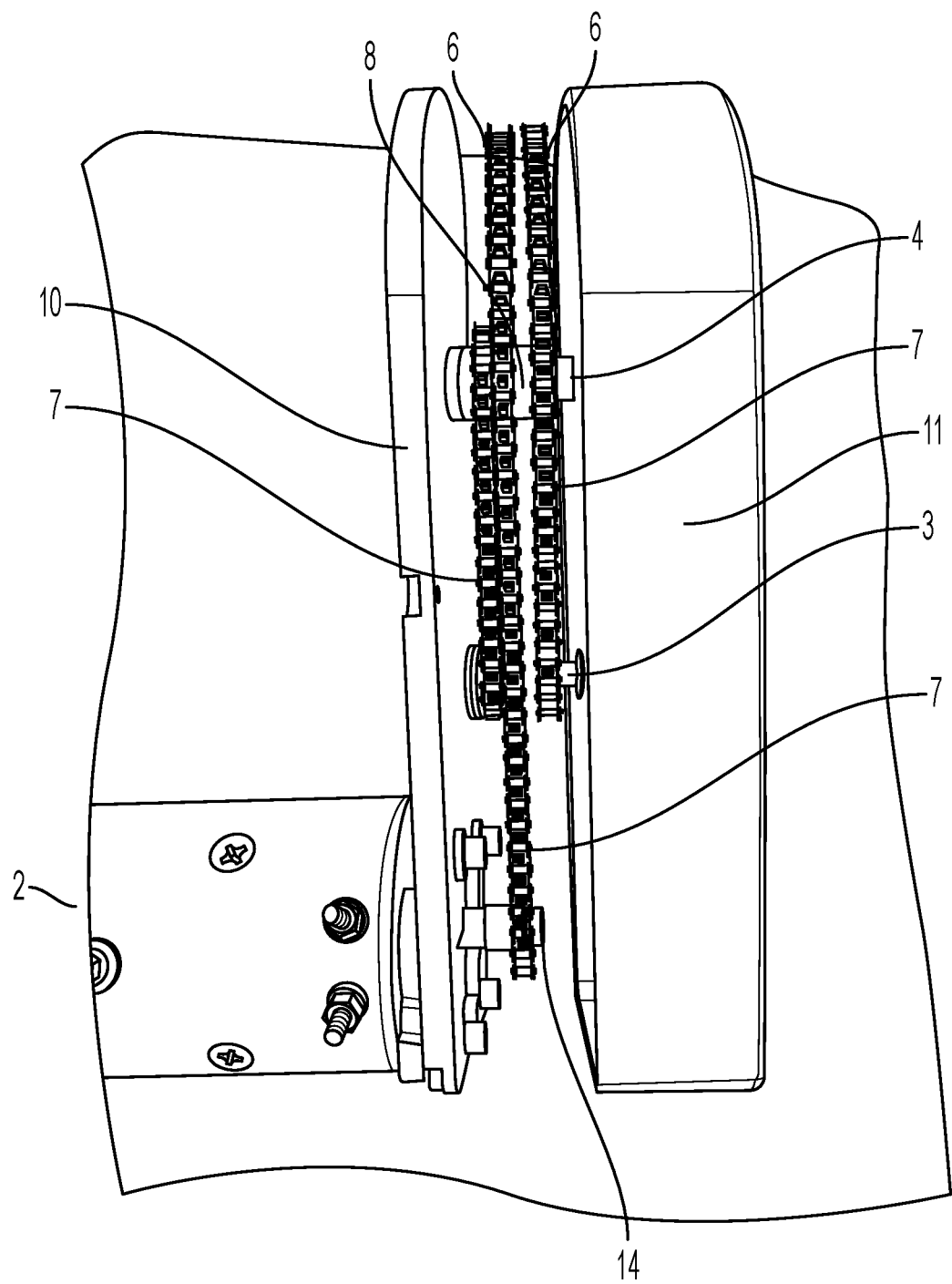
FIG. 3 is a top view of the first embodiment of the lifting unit with its front cover partially removed.
Figure 4:
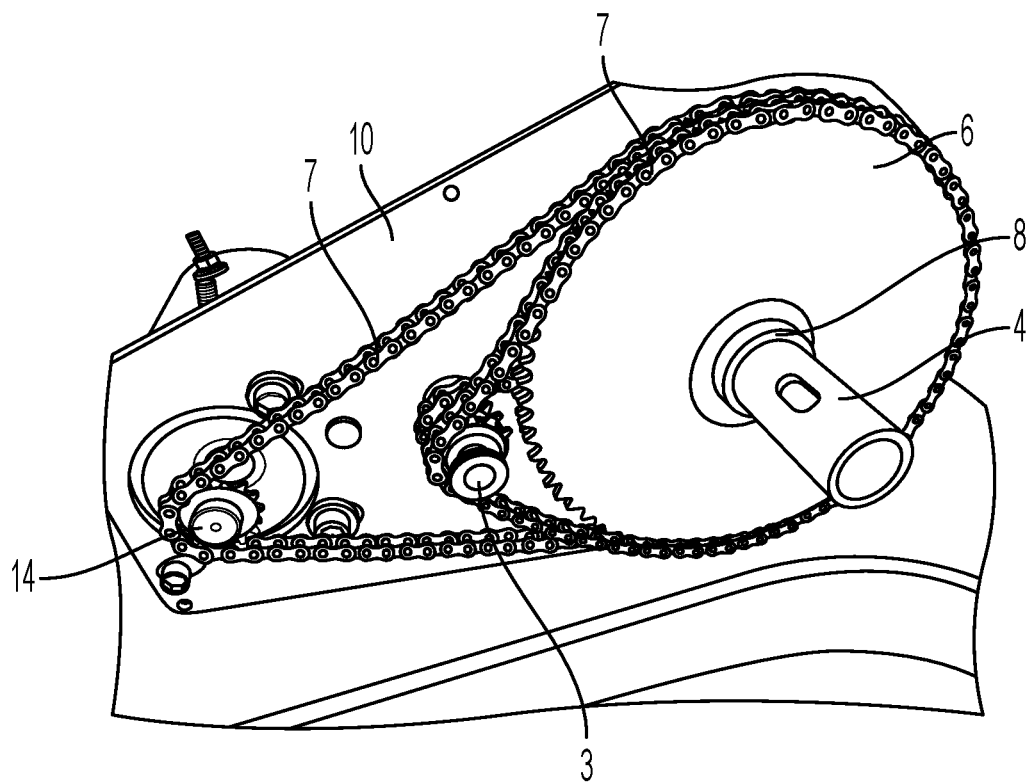
FIG. 4 is a perspective view of the first embodiment of the lifting unit with its front cover removed.
Figure 5:
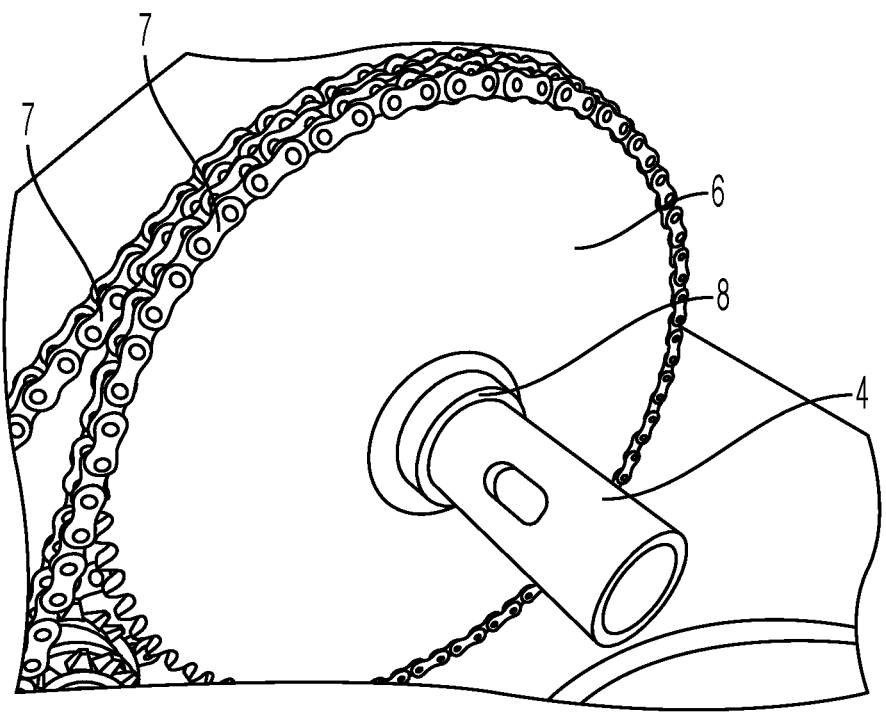
FIG. 5 is a perspective view of the first embodiment of the main drive assembly of the lifting unit.
Figure 6:
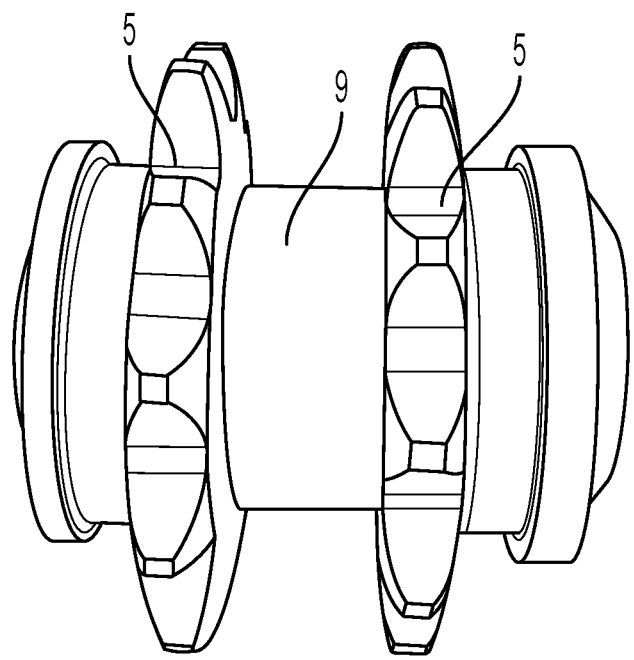
FIG. 6 is a side view of the first embodiment of the idler rod sprocket assembly.
Figure 7:
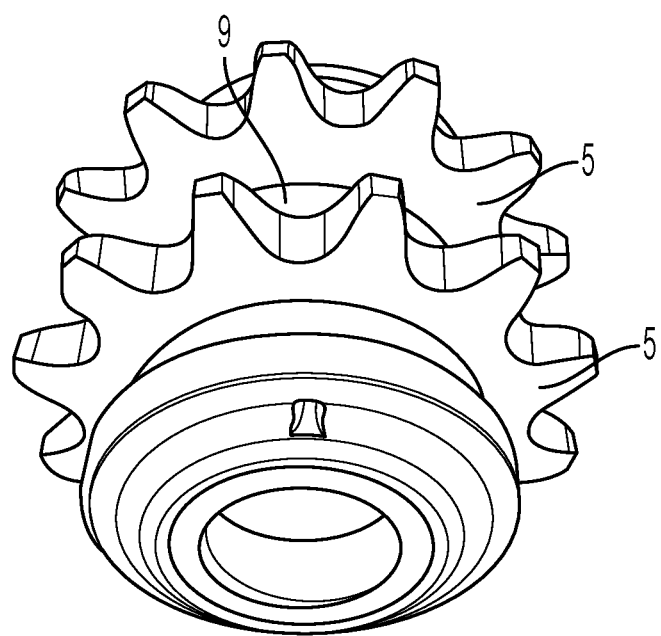
FIG. 7 is a perspective view of the first embodiment of the idler rod sprocket assembly.
Figure 8:
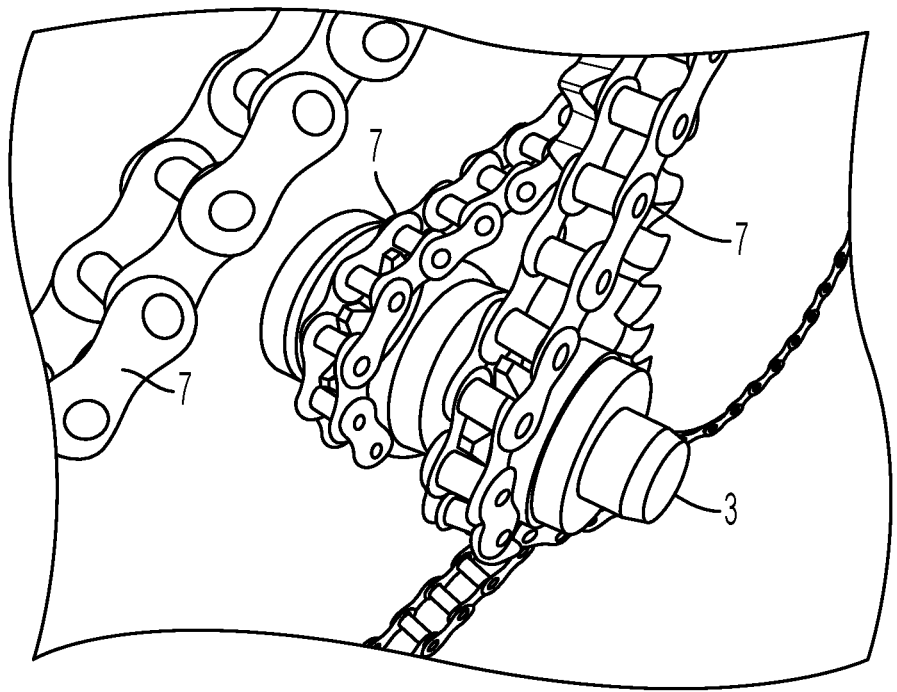
FIG. 8 is a perspective view of the first embodiment of the idler rod assembly of the lifting unit.
Figure 9:
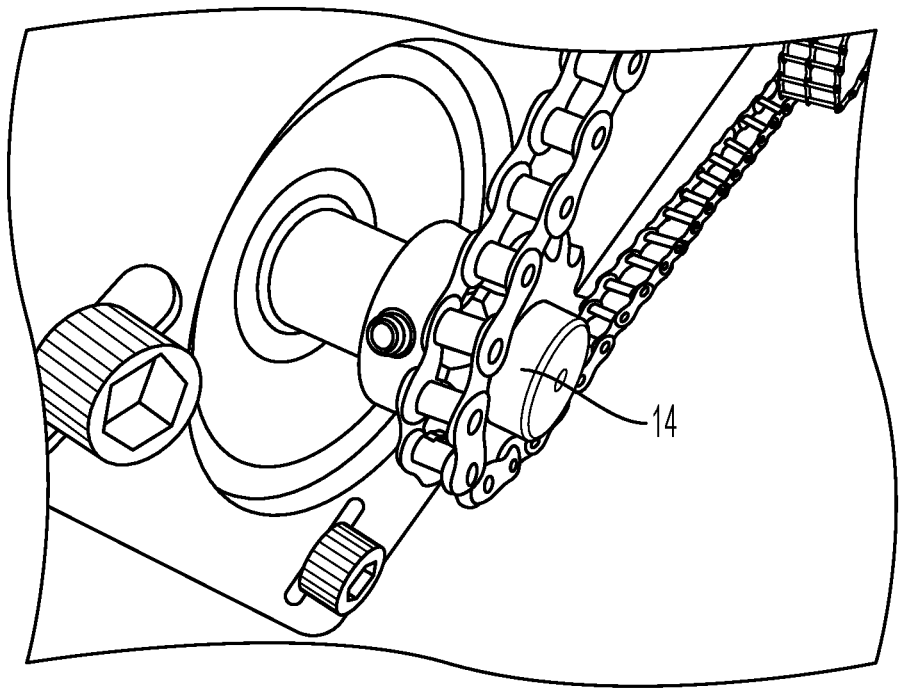
FIG. 9 is a perspective view of the first embodiment of the power drive shaft assembly of the lifting unit.
Figure 10:
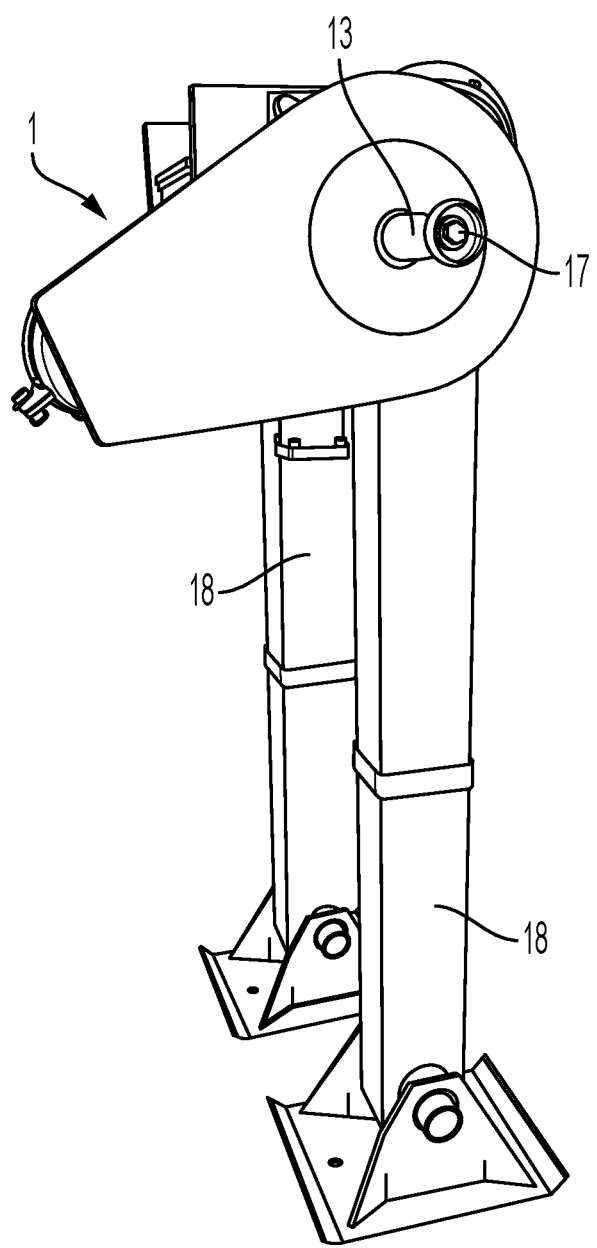
FIG. 10 is a perspective view of the first embodiment of the lifting system in place on dolly legs.
Figure 11:
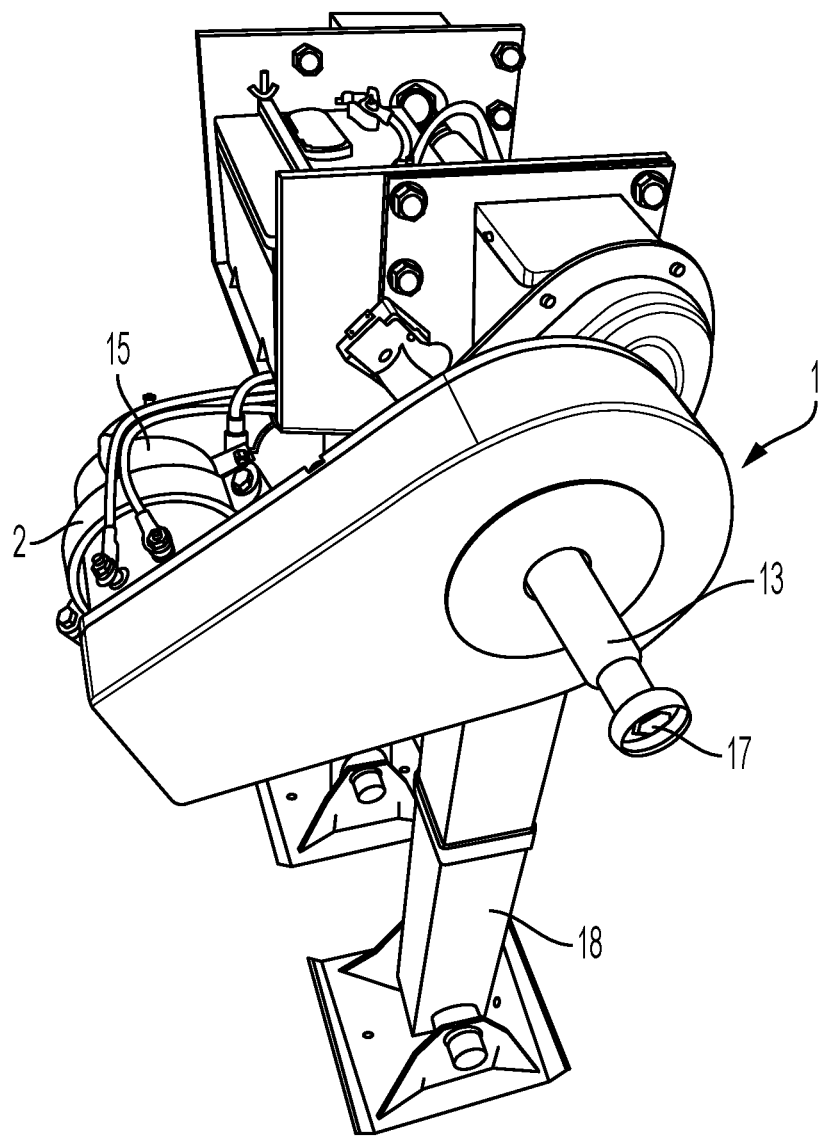
FIG. 11 is a different perspective view of the first embodiment of the lifting system in place on dolly legs.
Figure 12:
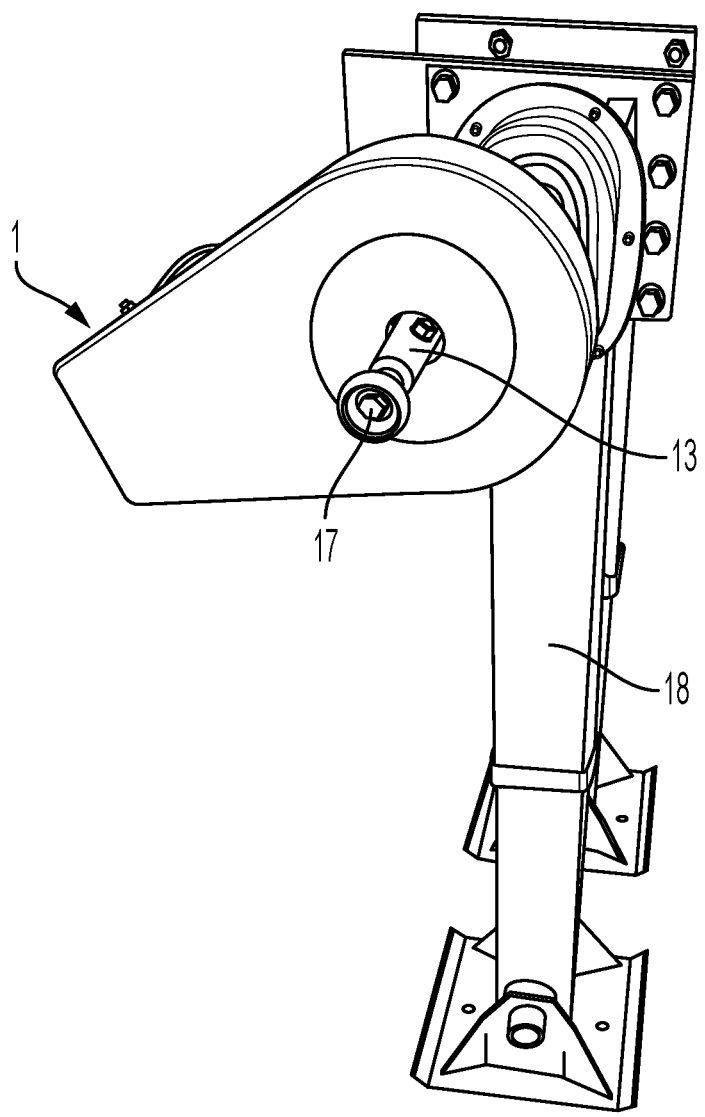
FIG. 12 is a different perspective view of the first embodiment of the lifting system in place on dolly legs.
Figure 13:
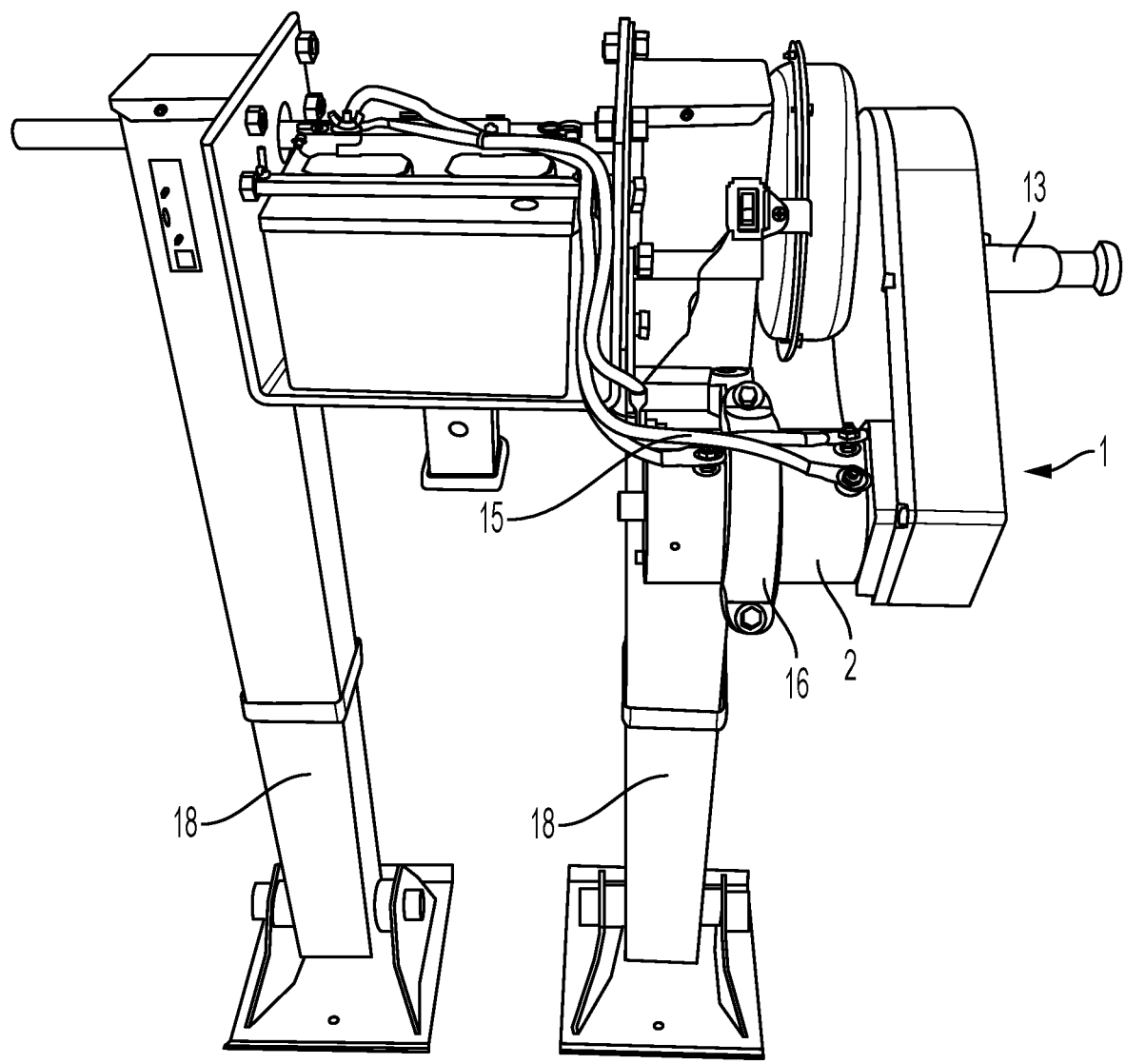
FIG. 13 is a side view of the first embodiment of the lifting system in place on dolly legs.
Figure 14:
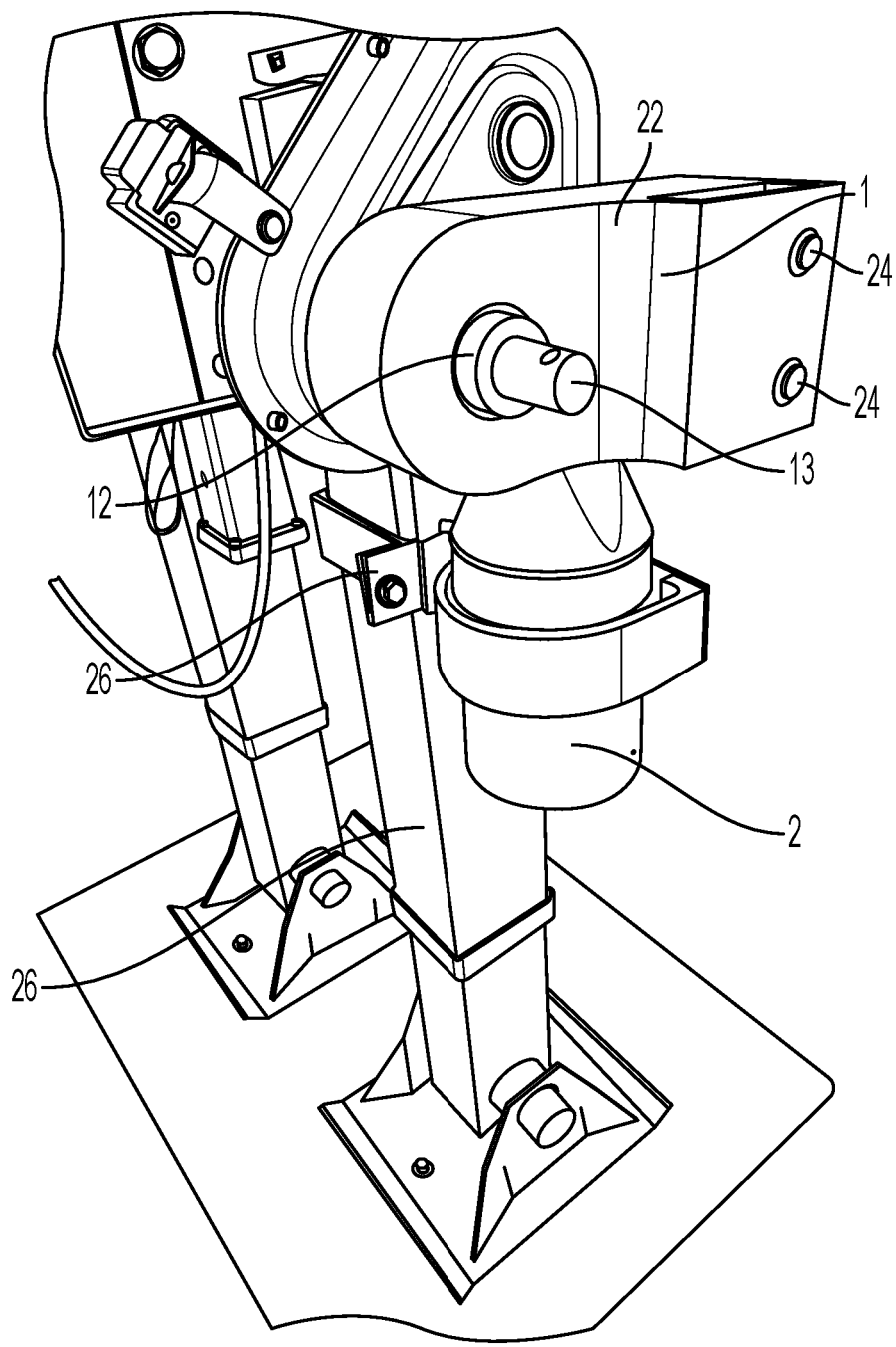
FIG. 14 is a perspective view of the second embodiment of the lifting system in place on dolly legs.
Figure 15:
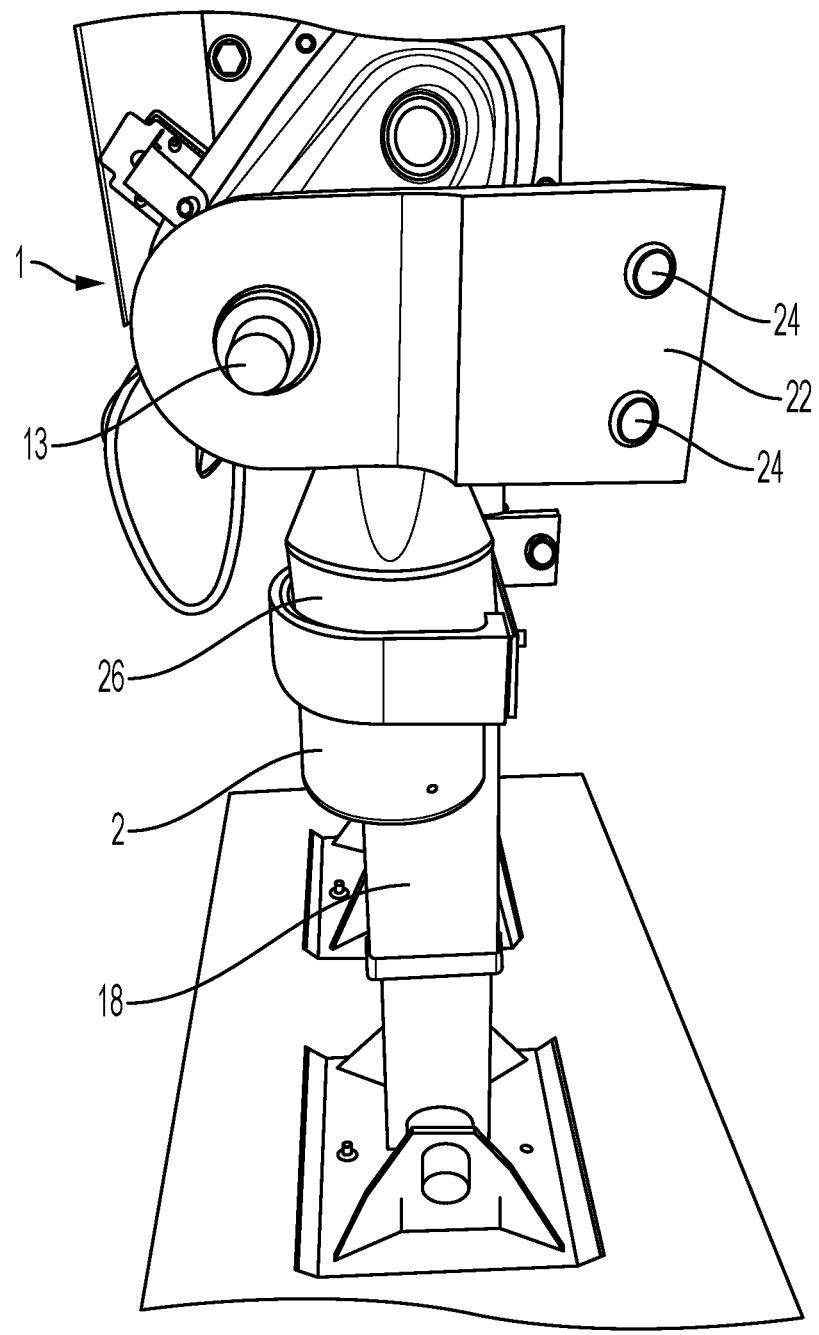
FIG. 15 is a different perspective view of the second embodiment of the lifting system in place on dolly legs.
Figure 16:
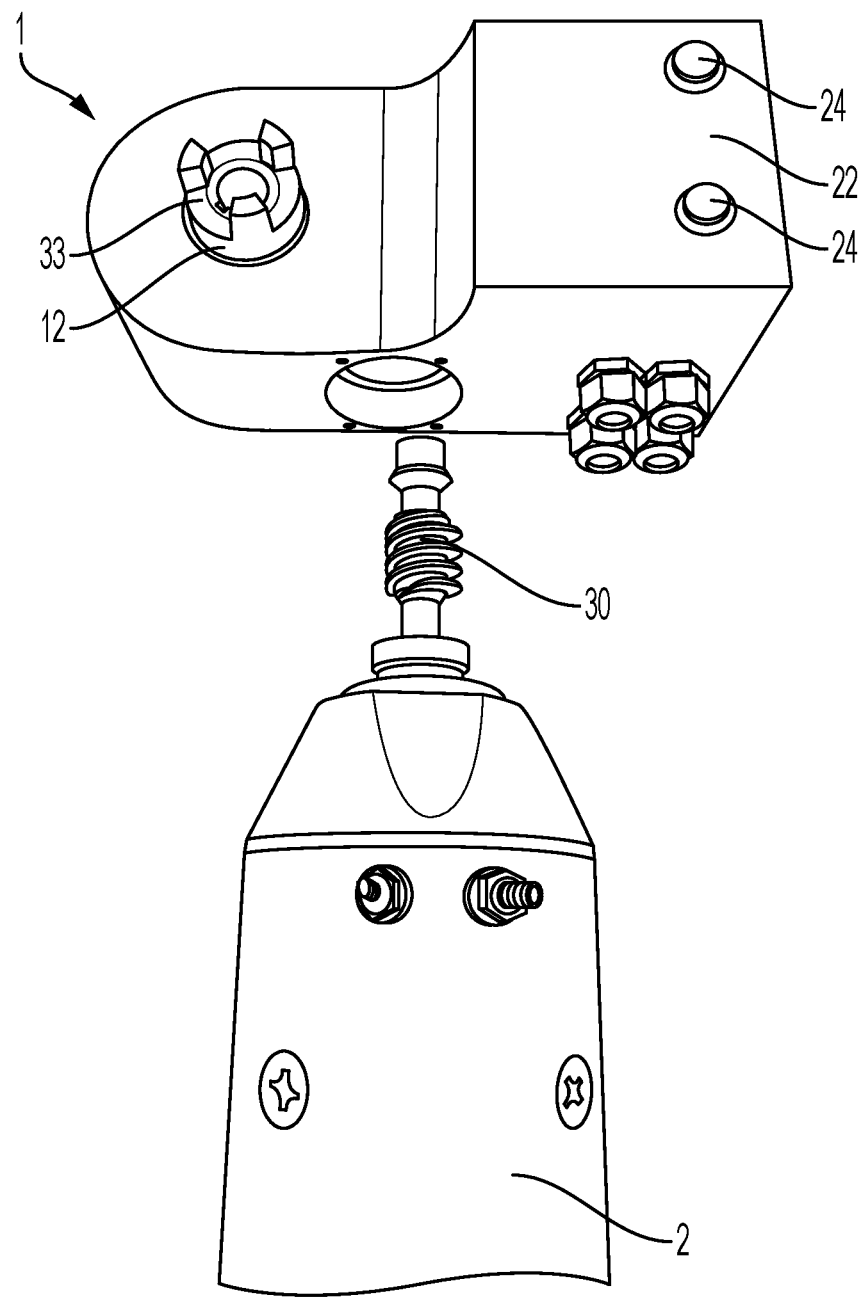
FIG. 16 is an exploded view of the second embodiment of the lifting system with the motor and worm drive separated from the housing.
Figure 17:
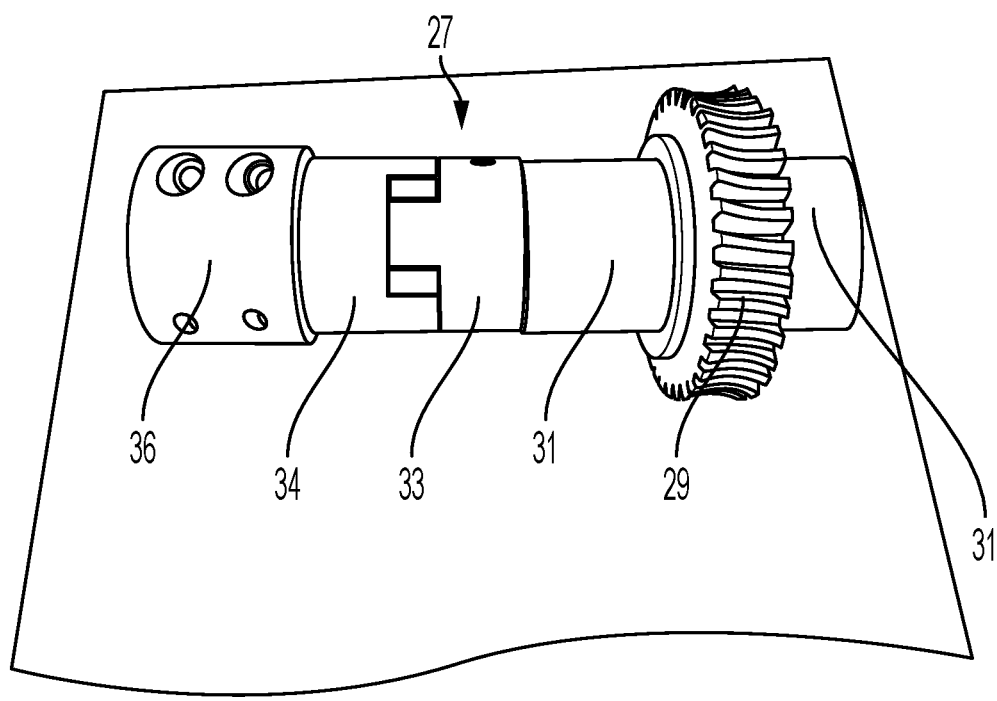
FIG. 17 is a side view of the drive gear, coupling, and clamp of the second embodiment of the lifting system.
Figure 18:
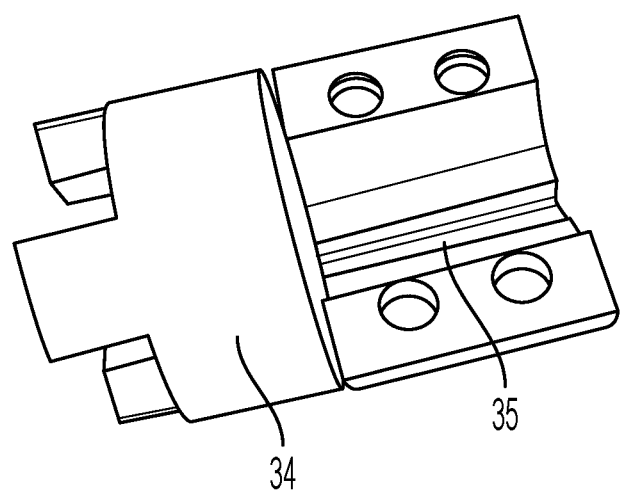
FIG. 18 is a side view of the second half of the coupling with integrated clamp half of the second embodiment of the lifting system.
Figure 19:
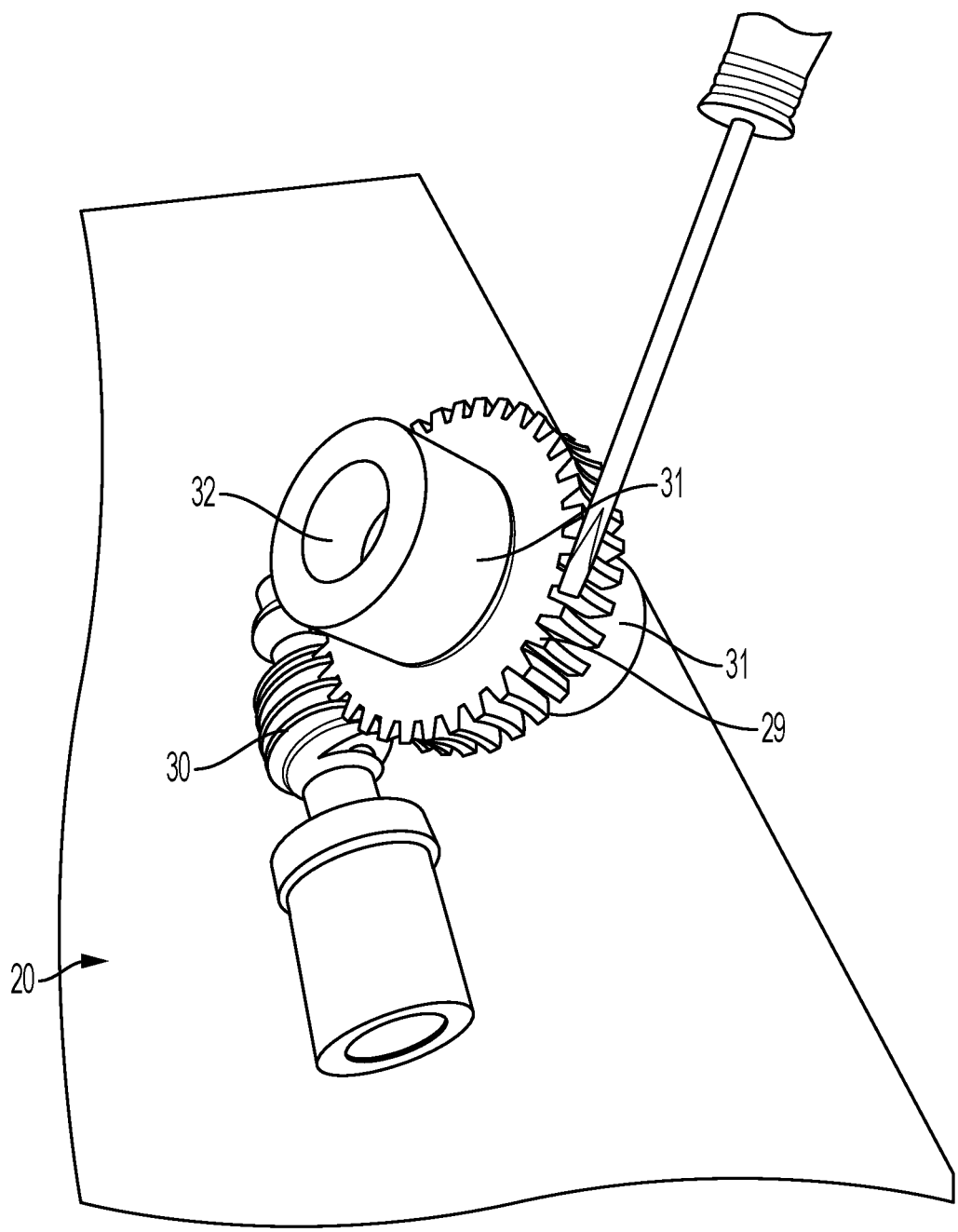
FIG. 19 is a perspective view of the worm drive gear assembly of the second embodiment of the lifting system.
Figure 20:
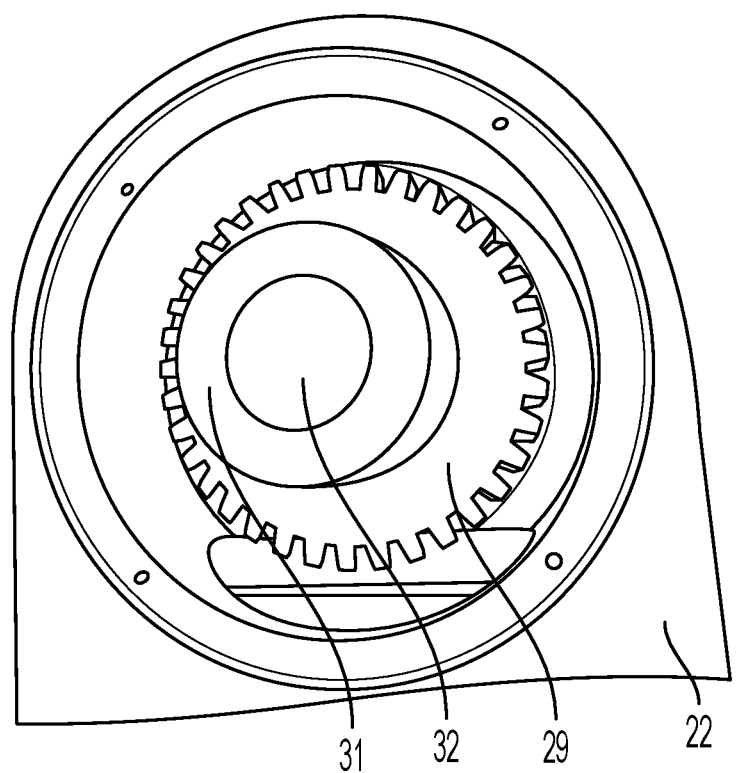
FIG. 20 is a perspective view of the drive gear in place in the housing of the second embodiment of the lifting system.
Figure 21:
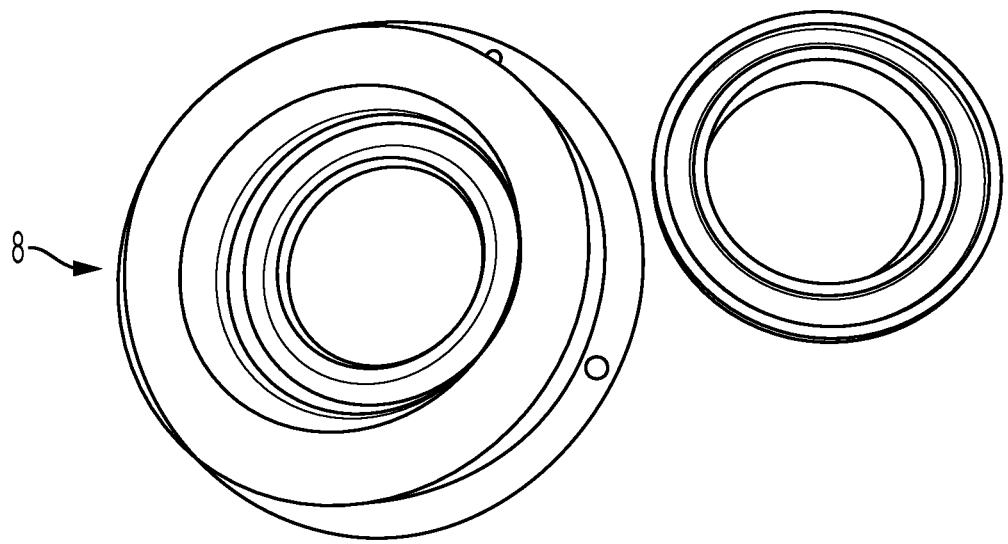
FIG. 21 is an exploded view of the bearing of the second embodiment of the lifting system.
Figure 22:
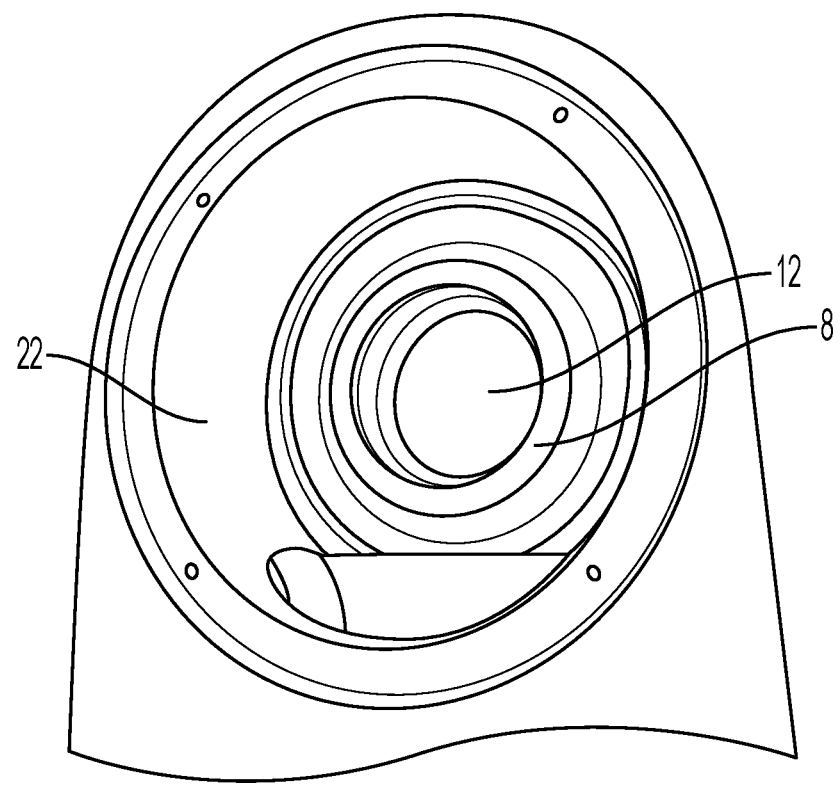
FIG. 22 is a perspective view of the bearing in place in the housing of the second embodiment of the lifting system.
Figure 23:
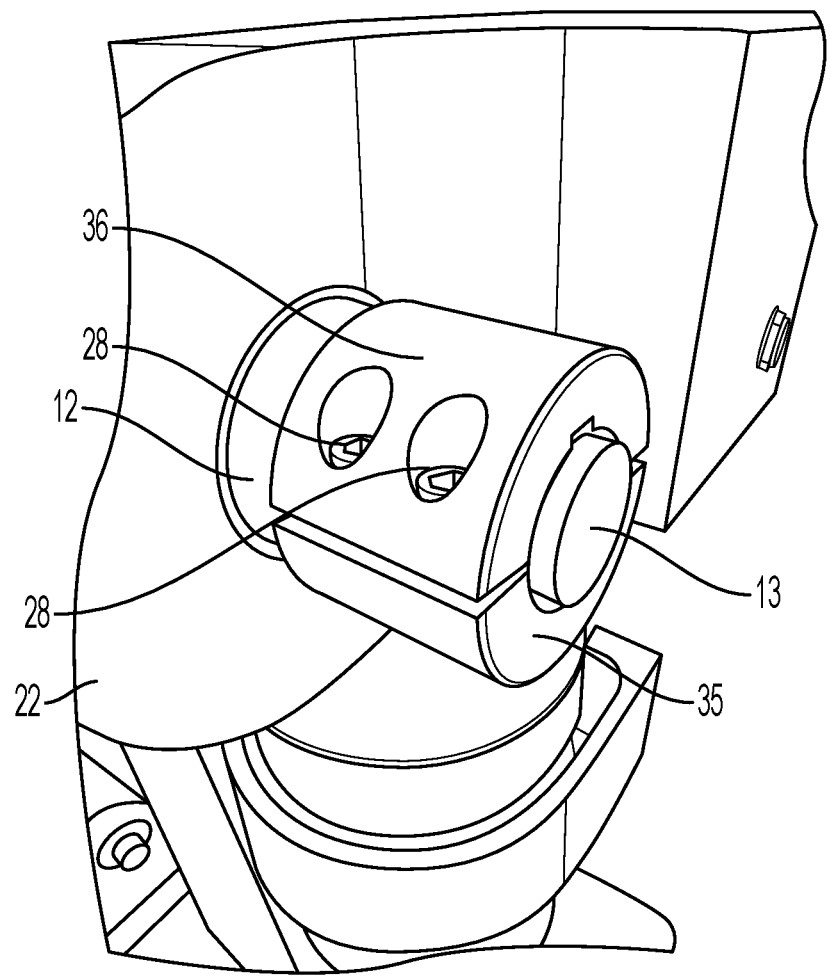
FIG. 23 is a perspective view of the clamp of the second embodiment of the lifting system in place on a shaft of a jack.
Figure 24:
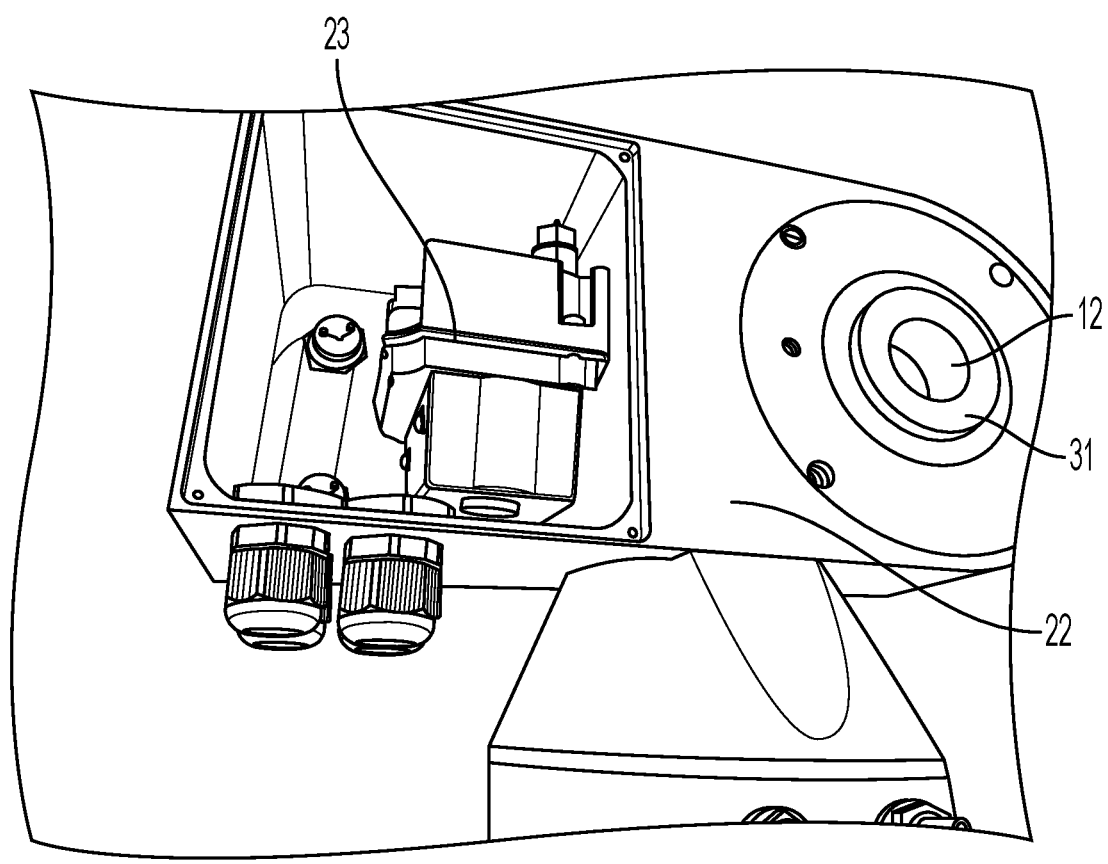
FIG. 24 is a perspective view inside the housing of the second embodiment of the lifting system.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a motorized lifting system for semi-trailers. The system may comprise a lifting unit 1 capable of replacing an original equipment jack handle from a trailer. The lifting unit 1 may work in conjunction with the existing jack, powering the jack and removing the necessity of manual cranking.

In a first embodiment, the lifting unit 1 may comprise a motor 2, an idler shaft 3, a main drive shaft 4, a plurality of sprockets 5 on the idler shaft 3, a plurality of sprockets 6 on the drive shaft 4, a plurality of chains 7, and a plurality of bearings, which may include sealed roller bearings 8 and/or bronze oil impregnated bearings 9, or any other desired bearings. All or some of these elements may be housed in a housing or cover. For example, as shown in the drawings, the lifting unit 1 may further comprise a back cover 10 and a front cover 11, which may connect together to form a cover over the majority of the other elements of the unit 1, excluding the motor.

Specifically, the motor 2 may be a 12-volt 4.2 HP DC motor with a ¾" shaft with keyway, or any other desired size or type of motor and shaft. The motor 2 may be reversable. The idler shaft 3 may be a fixed idler shaft with a ½" outside diameter, or any other desired size or type of idler shaft. The main drive shaft 4 may be hollow and may have a 1" inside diameter, or may be any other desired size or type of drive shaft.

The back cover 10 may have four holes for mounting the motor 2 to the outside of the cover. The opposite end of the back cover 10 may have a hole 12 capable of receiving the rod 13 of a jack with its jack handle removed. The main drive shaft 4 may be located inside the cover and may align with the hole 12 such that the main drive shaft 4 slides over the rod when the unit 1 is mounted to the jack. The main drive shaft 4 may have bearings 8 on each end. The bearings 8 on the main drive shaft 4 may be sealed roller bearings, which may allow the unit 1 to freely move without lubricant maintenance.

The fixed idler shaft 3 may be located in the middle of the back cover 10 and may run parallel to the main drive shaft 4. The fixed idler shaft 3 may be approximately 2½" long and ½" in diameter, or any other desired size. Two sprockets 5 may be located on the idler shaft 3. Both sprockets 5 may be identical, #35 pitch, 11 teeth sprockets. Alternately, either or both of the sprockets 5 may be any other desired size and/or may have any other desired number of teeth. The two sprockets 5 may be married together with a pressed in bronze oil impregnated bearing 9 between the two sprocket hubs. The sprockets 5 may be approximately 1" apart, or any other desired distance.

Three sprockets 6 may be located on the drive shaft 4. A first sprocket 6a may have 19 teeth, while a second sprocket 6b may have 70 teeth. Alternately, either or both of the sprockets 6 may have any desired number of teeth. The first and second sprockets 6a and 6b may be married together with a pressed in bronze oil impregnated bearing 9 between the two sprocket hubs. The first and second sprockets 6a and 6b may be approximately ¼" apart, or any other desired distance. A third sprocket 6c may be permanently attached to the drive shaft 4, such as by welding. The third sprocket 6c may have 70 teeth, or any other desired number of teeth.

The three chains 7 may be arranged as follows: the first chain 7a may connect the inside sprocket 5a on the idler shaft 3 to the first sprocket 6a on the main drive shaft 4; the second chain 7b may connect the motor 2 via a power drive shaft 14 thereof, which may have a single sprocket 15 with 12 teeth or any other desired number of teeth, to the second sprocket 6b on the main drive shaft 4; and the third chain 7c may connect the outside sprocket 5b on the idler shaft 3 to the third sprocket 6c on the main drive shaft 4.

The lifting unit 1 may be part of a kit sold to the customer, which may comprise other elements of the system. The kit may include the lifting unit 1, wiring cables 15, a limit switch, a hi-lo knob, a solenoid box, a connecting clamp 16, and a bolt 17 with a lock nut, or any combination thereof. The hi-lo knob may be a hollow tube with a bolt hole. The system may have one gear or two, or any desired number of gears. If the system has one gear, the hi-lo knob may be omitted. The connecting clamp 16 may be a U-shaped clamp on one end and a round clamp on the other end. The U-shaped clamp may be capable of clamping to the dolly leg 18 of the jack, while the round clamp may be capable of clamping to the motor 2. The connecting clamp 16 may maintain system stability on the jack.

During installation, the user may raise the trailer all the way up. The user may then remove the original equipment handle from the trailer by unscrewing its bolt, which may be a ⅜" bolt. The user may slide the lifting unit 1 over the rod 13 where the jack handle was removed, aligning the holes. The user may then slide the hi-lo knob, if present, over the rod 13, again aligning the holes. The user may attach the lifting unit 1 to the rod 13 with the new bolt 17 from the kit, which may likewise be a ⅜" bolt. The bolt 17 may have a lock nut to prevent overtightening. The user may use the connecting clamp 16 to clamp the dolly leg 18 to the motor 2. This may ensure unit stability when in operation. While the dolly legs 18 are still fully extended, the user may adjust the limit switch to prevent overextending the legs 18. The total travel distance of the dolly legs 18 may determine this adjustment. Depending on how the system is wired, it may be operated by controls located on the system itself, by controls located on the trailer, or via a remote control.

During use, the user may push a button on the lifting system, trailer, or remote option to raise or lower the dolly legs 18. If the system has two gears, a low gear may be used when lifting weight, while a high gear may be used when lowering the dolly legs 18. The unique sprocket configuration of the lifting system may allow the user to safely lift up to 65,000 lbs. if operated correctly.

In a second embodiment, the lifting unit 1 may use a worm drive gear assembly 20. The motor 2 may be a 12 volt 4.2 Hp DC reversible motor, or any other desired motor, and may run off a 12-volt battery 21. The battery 21 may be the existing battery of the trailer, or may be a battery 21 installed specifically for the operation of the lifting unit 1. A positive and ground lead may go to the housing 22 of the lifting unit 1. A portion of the housing 22 may serve as a compartment for relay and switch components 23, while the remainder of the housing 22 may house the worm drive gear assembly 20. The housing 22 may have openings 12 through which the shaft 13 of the jack may extend during use, and the openings 12 may be sealed with roller bearings 8, which may hold gear oil and which may not need to be serviced. Once it is hooked up, the lifting unit 1 may be controlled with up/down buttons 24. There may also be an on/off switch 25, which may be located on the bottom of the lifting unit 1.

The worm drive gear assembly 20 may a drive gear 29 and a worm 30. The worm 30 may connect directly to the motor 2 and may turn the drive gear 29. The drive gear 29 may have flanges 31 extending forward and rearward therefrom, with a bore 32 therethrough such that the shaft 13 may extend therethrough during use. A coupling 27 may clamp the drive gear assembly 20 to the shaft 13 during use so that the motor 2 turns the worm 30, which turns the drive gear 29, which then turns the shaft 13. The coupling 27 may be a love joy coupling, as shown, or any other desired coupling. A first half 33 of the coupling 27 may attach to or extend from the flange 31 extending through the opening 12, while a second half 34 of the coupling 27 may incorporate a clamp half 35, to which a second clamp half 36 may attach to securely clamp the coupling 27 to the shaft 13 during use.

During use, the user may remove the jack handle on the trailer, such as by removing a ⅜" bolt. The user may slide the lifting unit 1 over the shaft 13, such that the shaft 13 extends through the openings 12 in the housing 22, through the bore 32, and out the first half 33 of the coupling 27. The user may clamp a bracket 26 to the jack dolly leg 18 and to the motor 2 to hold the lifting unit 1 in place. Next, the user may connect the motor 2 to the shaft 13 via the worm drive gear assembly 20 and the coupling 27 by sliding the second half 34 of the coupling 27 over the shaft and clamping it to the shaft 13 by attaching the second clamp half 36 to the first clamp half 35 via one or more connecting devices 28, such as four bolts, with two on each side. The user may connect the battery cables to the battery 21. The user may operate the lifting unit 1 by turning on the unit 1 with the on/off switch 25 and raising or lowering the dolly legs 18 by pressing the up/down buttons 24. The lifting unit may provide 125 ft. lbs. of lifting torque, with a low gear side of jack 55K lifting capacity and 45 seconds full stroke.

Whereas, the devices and methods have been described in relation to the drawings and claims, it should be understood that other and further modifications, apart from those shown or suggested herein, may be made within the spirit and scope of this invention.

What is claimed is:

1. A method of using a lifting system to operate a jack, the method comprising:
   removing a handle from a rod of the jack;
   sliding a motorized lifting unit over a shaft of the jack; wherein the motorized lifting unit comprises:
   a motor;
   a worm drive gear assembly powered by the motor;
   a bracket capable of clamping to one of the dolly legs of the jack and to the lifting unit; and
   a coupling capable of connecting the worm drive gear assembly to the shaft of the jack, wherein the coupling is a dual-sided coupling comprising a first side and a second side, the first side comprising a love joy portion capable of connecting to the worm drive gear assembly and the second side comprising a clamp portion capable of connecting to the shaft;
   clamping the motorized lifting unit to the one or more dolly legs and to the motor via the bracket;
   connecting the worm drive gear assembly powered by the motor to the shaft via a coupling and connecting devices; and
   operating the lifting unit, which causes the one or more dolly legs of the jack to raise or lower.

2. A method of using a lifting system to operate a jack, the method comprising:
   removing a handle from a rod of the jack;
   sliding a motorized lifting unit over a shaft of the jack; wherein the motorized lifting unit comprises:
   a motor;
   chains and sprockets;
   a gear assembly powered by the motor;
   a bracket capable of clamping to one of the dolly legs of the jack and to the lifting unit; and
   a coupling capable of connecting the gear assembly to the shaft of the jack, wherein the coupling is a dual-sided coupling comprising a first side and a second side, the first side comprising a love joy portion capable of connecting to the gear assembly and the second side comprising a clamp portion capable of connecting to the shaft;
   clamping the motorized lifting unit to the one or more dolly legs and to the motor via the bracket;
   connecting the gear assembly powered by the motor to the shaft via a coupling and connecting devices; and
   operating the lifting unit, which causes the one or more dolly legs of the jack to raise or lower.

* * * * *